(12) United States Patent
Raspotnig

(10) Patent No.: US 6,543,957 B1
(45) Date of Patent: Apr. 8, 2003

(54) HOLDER AND HOUSING COMPRISING AT LEAST ONE HOLDER

(75) Inventor: Michael Raspotnig, Munich (DE)

(73) Assignee: PULS Elecktronische Stromversorgungen GmbH, Munich (DE)

(*) Notice: Subject to any disclaimer, the term of this patent is extended or adjusted under 35 U.S.C. 154(b) by 0 days.

(21) Appl. No.: 09/662,036

(22) Filed: Sep. 14, 2000

(51) Int. Cl.$^7$ .................................................. B25G 3/00
(52) U.S. Cl. .................... 403/286; 439/121; 439/532; 403/363; 403/375
(58) Field of Search ............................. 439/110, 116, 439/121, 532, 716, 717; 403/363, 375, 374.5, 338, 325, 257, 286; 248/298.1, 295.11, 694

(56) References Cited

U.S. PATENT DOCUMENTS 4,561,662 A * 12/1985 de Villepoix et al. ....... 277/647
5,114,367 A * 5/1992 Bolliger ...................... 434/716
5,915,978 A * 6/1999 Hayakawa et al. ......... 439/76.2

FOREIGN PATENT DOCUMENTS

| CH | 369180 | * | 6/1963 | ................. 439/717 |
| DE | 7426836 | | 11/1974 | |
| DE | 2710261 | | 9/1978 | |
| DE | 4203184 | | 8/1993 | |
| DE | 19646696 | | 4/1998 | |
| EP | 703640 B1 | * | 3/1996 | ........... H01R/9/26 |
| FR | 2269214 | * | 11/1975 | ................. 439/716 |
| FR | 2694846 | | 2/1994 | |
| IT | 554853 | * | 5/1958 | ................. 439/717 |

* cited by examiner

Primary Examiner—Lynne H. Browne
Assistant Examiner—Michael P. Ferguson
(74) Attorney, Agent, or Firm—Dilworth & Barrese LLP

(57) ABSTRACT

A holder is provided for attaching a housing to a rail, being securable to the housing and having a recess which is engagable with a projection of the rail and a flexible member having a closed cross-section and which is clearly deformable in a direction approximately perpendicular to a direction in which the holder is moved towards the rail during attachment, such that the flexible member is deformed and a clamping force is applied when the holder is moved towards and brought into contact with the rail.

29 Claims, 2 Drawing Sheets

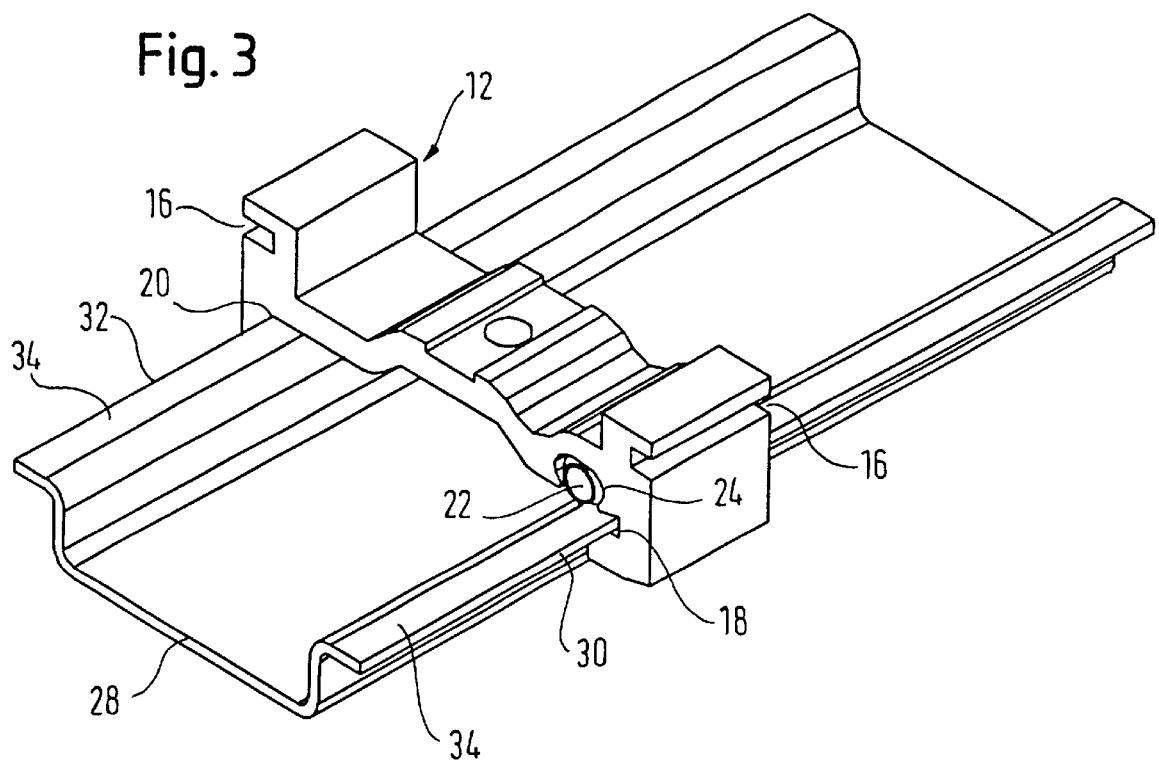
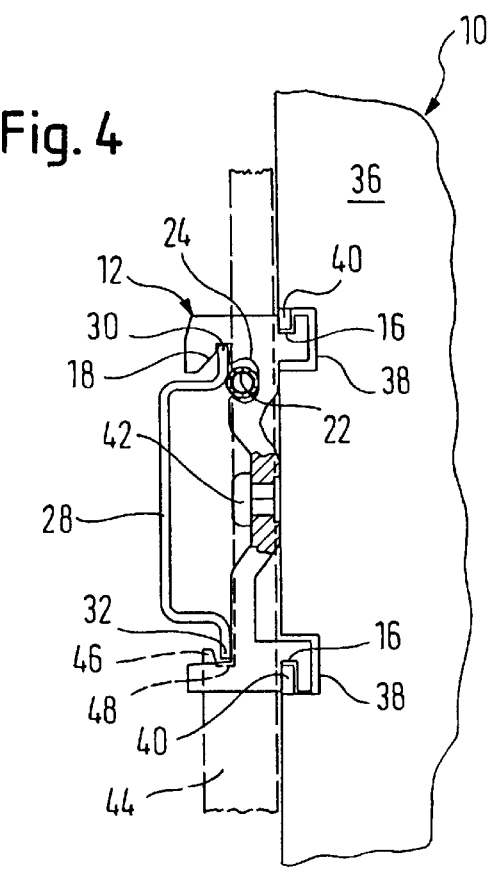

HOLDER AND HOUSING COMPRISING AT LEAST ONE HOLDER

U.S. Government may have certain rights in this invention pursuant to National Science Foundation contract numbers ACI-9624957, ACI-9721349, and DMS-9872890.

TECHNICAL FIELD

The present invention relates to a holder for attaching a housing to a rail and a housing comprising at least one such holder.

Particularly in the field of electrical installation, it is frequently necessary to attach various electrical devices to rails, e. g. holding rails with a hat-like cross-sectional configuration. A typical application can be seen in power supplies comprising housings, which need to be secured to a holding rail. In this context, any portions of the housing which are intended to securely attach the housing to the rail need to meet various requirements. Firstly, the housing should be mounted to the rail in a detachable manner. Secondly, the housing must be attached to the rail in a manner preventing any unintentional loosening or detachment of the housing. Finally, in some cases the housing has to be mounted on the rail in such a manner that an electrical contact between these members is ensured so that current can flow to the rail.

BACKGROUND ART

DE 196 46 696 C1 discloses a holder and a housing comprising a holder, wherein the holder is made of a section of a metal profile. The holder comprises projections, which are insertable into recesses of the housing's back wall in such a manner that the holder is secured to the housing. The holder further comprises a recess which is engageable with a projection, preferably an edge of the rail to which the housing is to be mounted. Finally, the holder comprises a comparably small projection, which is associated with the recess, in which the edge of the rail can be accommodated. When the housing is mounted to the rail, the holder is brought into engagement with the edge of the rail by "hooking" it onto the rail, so that the edge of the rail is located in the recess of the holder. Subsequently, the housing is pivoted somewhat in order to bring the housing towards the rail such that a separate locking member, comprising a biased locking element, can be engaged with the second edge of the rail, which lies opposite to the edge which is accommodated in the recess of the holder. During this pivoting motion, the above-mentioned small projection engages with the rail so that the housing is prevented from sliding or shifting in the longitudinal direction of the rail. However, this effect of the projection can only be guaranteed when the housing is attached to special types of rails having similar cross-sectional configurations. With differing types of rails, this cannot be ensured.

FL 2 694 846 discloses a mounting element for securing electrical devices to rails, wherein the mounting element comprises a flexible element of an approximately circular cross-section, which is used to snap the mounting element to the rail. In other words, the flexible element is somewhat deformed when the mounting element is attached to the rail, and returns to its original shape when the mounting element is in its final attached state. When the mounting element is to be detached, the flexible element again needs to be deformed in order to allow the edge of the rail to pass over the flexible element. However, in the attachment state, the flexible element is in its normal condition so that there is no clamping force applied which would prevent the mounting element from moving in the longitudinal direction of the rail.

Finally, EP 0 703 640 A1 discloses a screwless clamp comprising a flexible element with a first leg and second leg, one of which is moveable, and between which a clamping force is transmitted. The mobility of the flexible element both in the cross-section plane as well as perpendicular thereto is limited, in order to increase the clamping force when the limits of mobility are reached.

SUMMARY OF THE INVENTION

The invention was made in order to provide a holder for attaching a housing to a rail as well as a housing provided with such a holder, which is of simple construction and securely prevents a housing from moving in the longitudinal direction of the rail with modifications of standardized rails.

This objective is solved by means of a holder that is securable to a housing and which comprises a recess engageable with a projection of the rail, to which the housing is to be attached, and a flexible member. The flexible member comprises a closed cross-section and is freely deformable in the cross-sectional plane, i.e. in a direction approximately perpendicular to a direction in which the holder is moved towards the rail. In other words, in order to effect attachment, the holder is brought into engagement with or "hooked onto" a projection (preferably an edge of the rail) and is pivoted about this point of engagement so that the remainder of the holder is moved towards the rail. During this movement, the flexible member will come into contact with a suitable portion of the rail and will be deformed. Due to the fact that the flexible element is freely deformable in the mentioned direction, the flexible member will deform and thus apply a clamping force acting between the rail and the holder. In particular, the flexible member will remain in its deformed state as long as the housing is attached to the rail so that the clamping force is active in order to prevent the housing from moving or shifting in the longitudinal direction of the rail. Furthermore, free deformability of the flexible member ensures a gradually increasing clamping force without limitations or sudden increases of the clamping force. Finally, the holder according to the invention is configured very simply in that a section of a metal profile can be used and formed with an appropriate recess in order to accommodate the flexible member. Due to the closed cross-section, the flexible member itself is of a simple structure and can be manufactured, handled and mounted to the holder very easily.

Preferably, the flexible member comprises an approximately circular cross-section in order to give the flexible member an especially simple structure.

With regard to the material of the flexible member, plastic material is preferred. In particular, a special type of polyamide has been found to provide the flexible member with the required characteristics and simultaneously permits inexpensive mass production of this member as well as the inventive holder. In order to render the polyamide, which is preferably used for the flexible member, stable in an extended range of temperatures, certain additives are added to the basic polyamide. In this manner, the flexible member of polyamide can be made temperature-stable and flexible at the same time in a temperature range, which extends above 75° C.

In order to achieve the above-mentioned objective, the invention further provides a holder for attaching a housing to a rail, the holder being securable to the housing and comprising a recess engageable with a projection of a rail and also a flexible member with a tube-like structure. The tube-shaped flexible member is freely deformable while the holder is moved towards the rail and is brought into contact with the rail. Thus a clamping force is applied by means of the tube-shaped flexible member when a housing is secured to a rail by means of one or more of the described holders. The tube-like structure particularly permits an appropriate combination with a holder made from a section of a metal profile. Furthermore, the tube-shaped flexible member, preferably comprising an approximately circular cross-section, will easily deform from its circular state to an oval state when a gradually increasing clamping force is applied between the holder and the rail. Both with regard to the above described embodiment comprising a flexible member with a tube-like structure, and the embodiment, in which the flexible member comprises an essentially circular cross-section, it should be mentioned that these embodiments are particularly advantageous in that the flexible member with the described structure can be combined with the holder body in a manner to facilitate mounting of the holder to the rail by inserting the projection of the rail into the recess formed in the holder body. Firstly, the recess preferably comprises inclined flanks, in order to promote the inserting motion. Furthermore, this inserting motion is not hindered by the flexible element, which is located nearby the recess, because the flexible element comprises a circular cross-section, in particular a tube-like structure, so that in combination with the inclined flank of the recess a—as seen in the cross-section—funnel-like structure is formed. Furthermore, the contact point between the flexible member and the holder body can be formed such that any obstacles preventing the mentioned inserting motion are avoided.

In the case of a flexible member comprising a tube-like structure, it is preferred to form a bead or thickened portion around the outer periphery of the flexible member. The bead is capable of engaging a recess formed in the holder body in which the flexible member is accommodated. In other words, the dimension of the bead of the flexible member is adjusted to the size of the recess receiving the flexible member. Due to the fact that the bead can be kept smaller than the full length of the tube-shaped flexible member, a frictional force can be ensured when the flexible member is inserted into its recess, said frictional force being sufficient to retain the flexible member in the recess and simultaneously permit easy assembly of these components.

Also, plastic material (in particular polyamide) is preferred as the material for the flexible member for this embodiment.

As indicated above, in order to achieve the objective underlying the invention, the invention further provides a holder for attaching a housing to a rail, said holder being formed from a portion or section of a metal (preferably an aluminum) profile. In line with the inventive principle, the holder is securable to the housing and comprises a recess which is engageable with a projection of the rail, and a flexible member with a closed cross-section, which is freely deformable in a direction perpendicular to the direction in which the holder is moved towards the rail and brought into contact with the rail. As mentioned above, forming the holder, more specifically the holder body, from a section of a metal profile renders the holder a very inexpensive component. In particular, a metal profile, suitable for attaching the holder to a housing and permitting engagement of the holder with a rail, can be formed by extrusion or by any suitable continuous forming method which produces comparably long profiles of uniform cross-sections. The body of the inventive holder is obtained by means of cutting pieces of such a profile to a length of, for example, 10 mm. In this context, the disclosure of the above-mentioned DE 196 46 696 C1 is incorporated herein by means of this reference, and is considered to be a part of this specification.

In order to achieve the above-mentioned objective, the invention further provides a housing, in particular a power supply housing, which comprises at least one holder in one of the above-mentioned embodiments. Thus, the invention provides a housing comprising at least one holder for attaching the housing to a rail, the holder comprising a recess that is engageable with a projection of the rail, and a flexible member. The flexible member has a closed cross-section and is freely deformable in a direction approximately perpendicular to that direction in which the holder is moved towards the rail, so that the flexible element is deformed as long as the housing is attached to the rail by means of the holder, and a clamping force is applied which prevents the housing from moving in the longitudinal direction of the rail.

The invention further discloses a housing comprising at least one holder for attaching the housing to a rail, the holder comprising a recess which is engageable with a projection of the rail and a flexible member with a tube-like structure. The tube-shaped flexible element, preferably with an approximately circular cross-section will deform to an oval state when the holder is moved towards the rail and brought into contact with the rail. This deformation of the tube-shaped flexible element will apply a firm clamping force during attachment of the housing, so that any movement or shifting of the housing can be securely prevented.

The invention finally provides a housing comprising at least one holder for attaching the housing to a rail, the holder being made of a section of a metal profile. Furthermore, the holder comprises a recess which is engageable with a projection of the rail, and a flexible member with a closed cross-section which is freely deformable in a direction perpendicular to a direction in which the holder is moved towards the rail in order to bring the holder into contact with the rail and thus attach the housing to the rail.

With regard to the housing according to the invention, it is preferred that the housing additionally comprises a locking member for securing the housing to the rail. In other words, the holder is active for hooking the housing onto the rail at one edge of the rail, and the locking member, which is preferably biased into the locking direction, serves to lock the housing to the rail by means of a firm engagement with the opposite edge of the rail.

BRIEF DESCRIPTION OF THE DRAWINGS

Further advantages and features of the present invention will become apparent from the following description of a preferred embodiment thereof, which is to be taken with reference to the accompanying drawings, in which

FIG. 3 shows a perspective view of the holder according to the invention attached to a holding rail; and FIG. 4 shows a cross-sectional view of the attachment of the housing according to the invention.

BEST MODE FOR CARRYING OUT THE INVENTION

Figure 1:
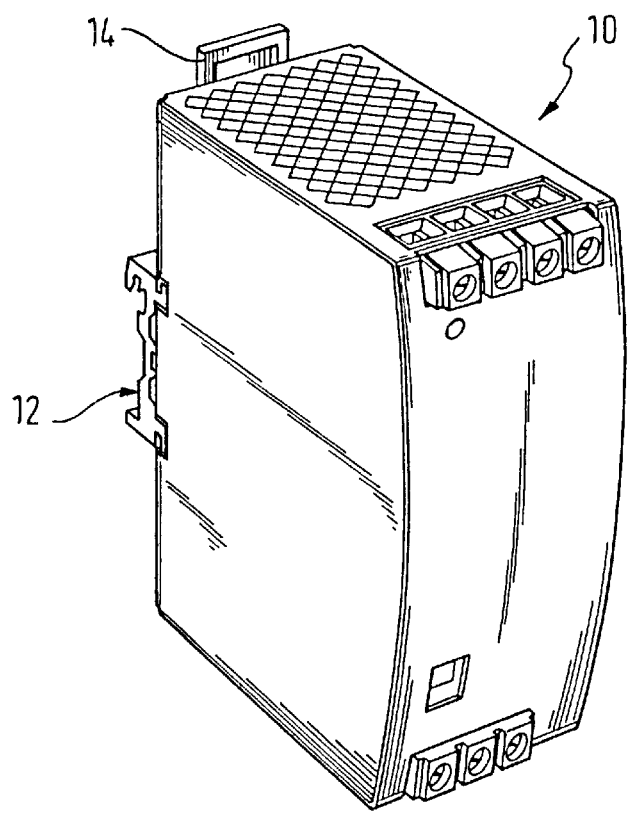
FIG. 1 shows a perspective view of the housing according to the invention equipped with a holder according to the invention.

FIG. 1 shows a housing 10 of a power supply, which is to be attached onto a holding rail (described later) by means of one or more of the holders 12 according to the invention, which can be seen at the back wall of the housing 10 shown in FIG. 1. The holders 12 are fixed to the housing 10 in a manner which will be described in more detail below. At the rear of the housing 10, the upper part of a separate locking member 14 can be seen, which serves to lock the housing 10 shown in FIG. 1 to a holding rail, as will also be described in more detail below.

Figure 2:
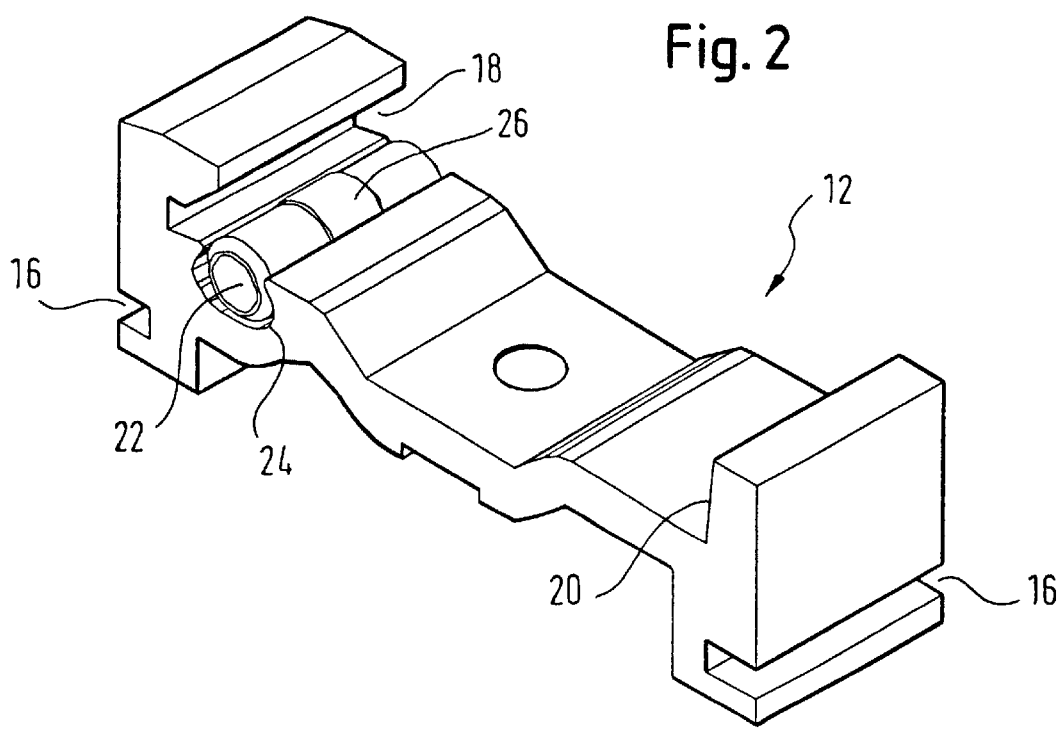
FIG. 2 shows a perspective view of the holder according to the invention.

In FIG. 2 a preferred embodiment of the holder 12 according to the invention is shown. The depicted embodiment is formed as a section of a metal profile comprising a uniform cross-section throughout its entire length. By means of this method of manufacturing the holder 12 according to the invention, this component can be produced in an inexpensive manner. As can be seen from the drawing, the holder comprises, at the lower side according to the orientation of FIG. 2, a groove 16 both at the upper and the lower edge. By means of these grooves the holder 12 can be attached to the housing 10 by inserting it, from the sides thereof, into appropriate apertures formed in the sidewalls of the housing 10 (see FIG. 1) such that an adjacent edge of the back wall of the housing enters the respective groove 16. With regard to attaching the holder 12 to the housing 10, reference is again made to DE 196 46 696 C1 of the applicant, in which the details regarding manufacturing and attaching the holder 12 are described. In particular, the disclosure of the above-mentioned document in this respect is incorporated herein by means of the reference.

In the upper region of the holder 12 and in that portion thereof which in use is directed to a rail (not shown), to which the housing is to be mounted, a further groove or recess 18 is formed. As can be seen from the tapered structure of the upper flank of the groove 18, the holder 12 and the housing 10 in combination therewith can be hooked onto a rail (not shown) in an at least somewhat pivotable manner. When the holder 12 is hooked onto the rail, it is subsequently pivoted such that the opposite end of the holder 12, e.g. the shoulder 20, is also located to lie adjacent to the opposite edge of the rail.

During this movement, in order to fully attach the holder 12 to the rail and, subsequently, as long as the holder 12 is attached to the rail, the flexible member 22 is deformed from the essentially circular cross-sectional state shown to an oval state. For this reason, the groove 24 is formed wide enough accommodating the flexible member 22. In the depicted embodiment, the flexible member 22 is formed as a tube-like member made of a plastic material, preferably a special type of polyamide. The ends of the flexible member 22 are somewhat tapered, in order to facilitate insertion of the flexible member 22 into the groove 24.

In order to ensure that the flexible member 22 remains in the groove 24, a bead 26 extends around the entire periphery of the flexible member 22, and is in engagement with at least the bottom of the groove 24 and the upper edges defining the groove's opening. The bead 26 extends approximately at the center of the longitudinal extension of the flexible member 22 for about a third of the length thereof. Naturally, the dimensions of the bead could also be different.

As can better be seen from FIG. 3, the flexible member 22 is in contact with the rail 28 when the housing (not shown in FIG. 3) is attached to the rail 28 by means of one or more of the shown holders 12. In the attachment state, the holder 12 has been brought into engagement or "hooked onto" the rail 28 by means of inserting the edge 30 of the rail 28 into the groove 18. The holder 12 has subsequently been moved towards the rail 28 such that the shoulder 20 mentioned above has passed over the opposite edge 32 of the rail. During this movement and as long as the holder 12 remains attached to the rail 28, the flexible member 22 is deformed from its original, circular cross-sectional state to a more oval state. The dimensions of the groove 24, in which the flexible member 22 is accommodated, in particular with regard to the lateral direction, allow this deformation of the flexible member 22. In its deformed state, the flexible member 22 exerts a clamping force between the holder 12 and the rail 28. This clamping force ensures sufficient friction in order to prevent the holder 12 and, as a consequence, the housing 10, from moving in the longitudinal direction of the rail.

Providing the flexible member 22 on the holder 12 is particularly advantageous with regard to different types of rails, to which housings have to be attached. Although such rails are in part standardized, different types of rails have emerged and are in widespread use. These rails, which do not necessarily have to comprise the hat-like cross-sectional configuration shown in FIG. 3, can differ with regard to the thickness of the sheet metal used, the width of the side flanges 34, and many further features. Due to the fact that the flexible member 22 can deform freely, it can compensate for tolerances with regard to the positional relationship between the holder 12 and different types of rails. At an appropriate point during the attaching movement of the holder, the flexible member 22 will come into contact with an appropriate portion of the rail, will be deformed and will subsequently exert the required clamping force.

In FIG. 4 a part of the side wall 36 of the housing 10 is shown. As can be seen from the figure, cut-outs 38 are formed in the side wall 36 in order to accommodate the portions of the holder 12 surrounding the grooves 16. These portions can be inserted through these cut-outs 38, as well as additional cut-outs, which are formed in the back wall of the housing 10. These cut-outs of the back wall are formed somewhat smaller than the cut-outs 38, which can be seen in FIG. 4, so that adjacent portions of the back wall, which are denoted with reference numeral 40 in FIG. 4, can be accommodated in the grooves 16. In particular, the dimensions of the grooves 16 and the distance between these are adjusted with regard to the distance between the mentioned portions 40 such that the holder 12 can be clamped self-securingly onto the housing 10. In the depicted embodiment, an additional fixing means 42 is used.

In the left part of FIG. 4, the attachment state of the holder 12 onto the rail 28 is shown. In particular, it can be seen that the flexible member 22 has deformed somewhat and has expanded into the groove 24, which is bulged somewhat in order to allow this deformation of the flexible member 22. Furthermore, in FIG. 2 a separate locking member 44 is shown, which is movable in the vertical direction and preferably biased into the locking position, which is shown in FIG. 4. In the locking position of the locking member 44, a locking projection 46, which is formed adjacent to a groove 48, is located such that the edge 32 of the rail 28 is retained by means of the locking projection 46. In the position shown in FIG. 4, any detachment or loosening of the housing 10 from the rail 28 is securely prevented by means of the upper groove 18 which accommodates the upper edge 30 of the rail as well as the groove 46 of the locking member 44 accommodating and retaining the opposite edge 32 of the rail 28. In order to detach the housing 10 from the rail 28, the locking member 44 is moved downwards somewhat, and the lower part of the housing 10 can thus be separated from the rail 28. Subsequently, the housing 10 can be entirely removed from the rail 28 by means of a detachment movement, which is directed upwards and somewhat to the right according to FIG. 4.

As will easily be understood by the skilled reader, both the locking member 44 as well as the holder 12 could be manufactured and configured differently from the embodiment that is shown in the drawings. In particular, the locking member 44 does not necessarily have to be movable in the vertical direction. Rather, the locking member could be formed by any type of snapping means that are suitable for passing over the edge 32 of the rail 28 while retaining this edge 32 during attachment of the housing 10. In particular, a flexible locking hook could be formed on the holder 12 itself. Furthermore, instead of the locking projection 46, any type of flexible member, in particular comprising a circular cross-section as the flexible member 22, could be used in order to snappingly engage the edge 32 of the rail 28 such that the flexible member returns to its original state and remains in its original state as long as the housing 10 is attached to the rail 28.

In contrast, the flexible member 22 remains in the deformed state in order to continuously apply a clamping force between the holder 12 and the rail 28. In particular, the holder 12 according to the invention comprising the flexible member 22 compensates for varying dimensions and structures of different types of rails and serves to apply this clamping force in combination with various types of rails. As regards the flexible member, it should be mentioned that this flexible member could, for example, also be formed of a solid piece of rubber comprising any suitable cross-section. However, a circular cross-section will also in this case be preferred. Furthermore, the holder 12 and the flexible member 22 do not necessarily have to be separate components. Rather, the holder 12 could be manufactured such that the flexible member 22 is integrally incorporated. For example, a hole, which is formed in the cross-section of the holder, could be made such that it extends through the holder in a manner corresponding to the hole of the shown tube-like flexible member 22. Accordingly, the portions of such an integrally formed holder 12 surrounding the hole constitute the flexible member, which is deformed during attachment and, therefore, exerts the desired clamping force. Moreover, the holder 12 does not necessarily have to be made of metal and, in particular, of a metal profile. Rather, the holder 12 could, with or without an integral flexible member, be formed from plastic material by means of a suitable method of manufacturing, e.g. injection molding.

What is claimed is:

1. A holder for attaching a housing to a rail having a projection and a surface, the holder being securable to the housing, the holder comprising:
   a recess, which is engagable with the projection of the rail, and
   a flexible member with a closed cross-section, which is freely deformable in a direction approximately perpendicular to a direction in which the holder is moved towards the rail during attachment,
   the flexible member being disposed such that the flexible member is located between the holder and the surface of the rail when the projection of the rail is engaged with the recess and the holder is pivotally moved towards and brought in contact with the rail,
   whereby the flexible member is deformed, and a clamping force is applied.

2. A holder according to claim 1, characterized in that the flexible member comprises an approximately circular cross-section.

3. A holder according to claim 1, characterized in that the flexible member is made of a plastic material.

4. A holder according to claim 2, characterized in that the flexible member is made of a plastic material.

5. A holder for attaching a housing to a rail having a projection and a surface, the holder being securable to the housing, the holder comprising:
   a recess, which is engagable with the projection of the rail, and
   a flexible member with a tube-like structure, which is freely deformable in a direction approximately perpendicular to a direction in which the holder is moved towards the rail during attachment,
   the flexible member being disposed such that the flexible member is located between the holder and the surface of the rail when the projection of the rail is engaged with the recess and the holder is pivotally moved towards and brought in contact with the rail,
   whereby the flexible member is deformed and a clamping force is applied.

6. A holder for attaching a housing to a rail, the holder being securable to the housing, the holder comprising:
   a recess, which is engagable with a projection of the rail, and
   a flexible member with a tube-like structure, which is freely deformable in a direction approximately perpendicular to a direction in which the holder is moved towards the rail during attachment such that the flexible member is deformed, and a clamping force is applied when the holder is moved towards and brought in contact with the rail,
   characterized in that a bead is formed around at least a portion of the outer periphery of the flexible member comprising a tube-like structure.

7. A holder according to claim 5, characterized in that the flexible member is made of a plastic material.

8. A holder according to claim 6, characterized in that the flexible member is made of a plastic material.

9. A holder for attaching a housing to a rail having a projection and surface, the holder being formed from a portion of a metal profile, and the holder comprising:
   a recess, which is engagable with the projection of the rail, and
   a flexible member with a closed cross-section, which is freely deformable in a direction approximately perpendicular to a direction in which the holder is moved towards the rail during attachment,
   the flexible member being disposed such that the flexible member is located between the holder and the surface of the rail when the projection of the rail is engaged with the recess and the holder is pivotally moved towards and brought in contact with the rail,
   whereby the flexible member is deformed, and a clamping force is applied.

10. A holder for attaching a housing to a rail, the holder being formed from a portion of a metal profile, and the holder comprising:
    a recess, which is engagable with a projection of the rail, and
    a flexible member with a closed cross-section, which is freely deformable in a direction approximately perpendicular to a direction in which the holder is moved towards the rail during attachment such that the flexible member is deformed, and clamping force is applied when the holder is moved towards and brought in contact with the rail,
    characterized in that the flexible member comprises a tube-like structure and is provided with a bead formed around at least a portion of the periphery of the flexible member.

11. A holder according to claim 9, characterized in that the flexible member is made of a plastic material.

12. A holder according to claim 10, characterized in that the flexible member is made of a plastic material.

13. A housing comprising at least one holder for attaching the housing to a rail having a projection and a surface, the holder comprising:

a recess, which is engagable with the projection of the rail, and a flexible member with a closed cross-section, which is freely deformable in a direction approximately perpendicular to a direction in which the holder is moved towards the rail during attachment, the flexible member being disposed such that the flexible member is located between the holder and the surface of the rail when the projection of the rail is engaged with the recess and the holder is pivotally moved towards and brought in contact with the rail, whereby the flexible member is deformed and a clamping force is applied.

14. A housing according to claim 13, characterized in that the housing further comprises a locking member for securing the housing to the rail.

15. A housing comprising at least one holder for attaching the housing to a rail having a projection and a surface, the holder comprising:

a recess, which is engagable with the projection of the rail, and a flexible member with a tube-like structure, which is freely deformable in a direction approximately perpendicular to a direction in which the holder is movable towards the rail during attachment, the flexible member being disposed such that the flexible member is located between the holder and the surface of the rail when the projection of the rail is engaged with the recess and the holder is pivotally moved towards and brought in contact with the rail, whereby the flexible member is deformed, and a clamping force is applied.

16. A housing according to claim 15, characterized in that the housing further comprises a locking member for securing the housing to the rail.

17. A housing comprising at least one holder for attaching the housing to a rail having a projection and a surface, the holder being made from a portion of a metal profile, the holder comprising:

a recess, which is engagable with the projection of the rail, and a flexible member with a closed cross-section which is freely deformable in a direction approximately perpendicular to a direction in which the holder is moved towards the rail during attachment, the flexible member being disposed such that the flexible member is located between the holder and the surface of the rail when the projection of the rail is engaged with the recess and the holder is pivotally moved towards and brought in contact with the rail, whereby the flexible member is deformed, and a clamping force is applied.

18. A housing according to claim 17, characterized in that the flexible member comprises a tube-like structure.

19. A housing according to claim 17, characterized in that the housing further comprises a locking member for securing the housing to the rail.

20. A housing according to claim 18, characterized in that the housing further comprises a locking member for securing the housing to the rail.

21. A holder according to claim 9, wherein the metal profile is an aluminum profile.

22. A holder according to claim 10, wherein the metal profile is an aluminum profile.

23. A housing according to claim 17, wherein the metal profile is an aluminum profile.

24. A holder according to claim 3, wherein the flexible member is made of polyamide.

25. A holder according to claim 4, wherein the flexible member is made of polyamide.

26. A holder according to claim 7, wherein the flexible member is made of polyamide.

27. A holder according to claim 8, wherein the flexible member is made of polyamide.

28. A holder according to claim 11, wherein the flexible member is made of polyamide.

29. A holder according to claim 12, wherein the flexible member is made of polyamide.

* * * * *